April 17, 1951  T. J. HUDSON  2,549,606
MACHINE TOOL

Filed June 20, 1945  4 Sheets-Sheet 1

INVENTOR.
THOMAS J. HUDSON
BY
ATTORNEYS

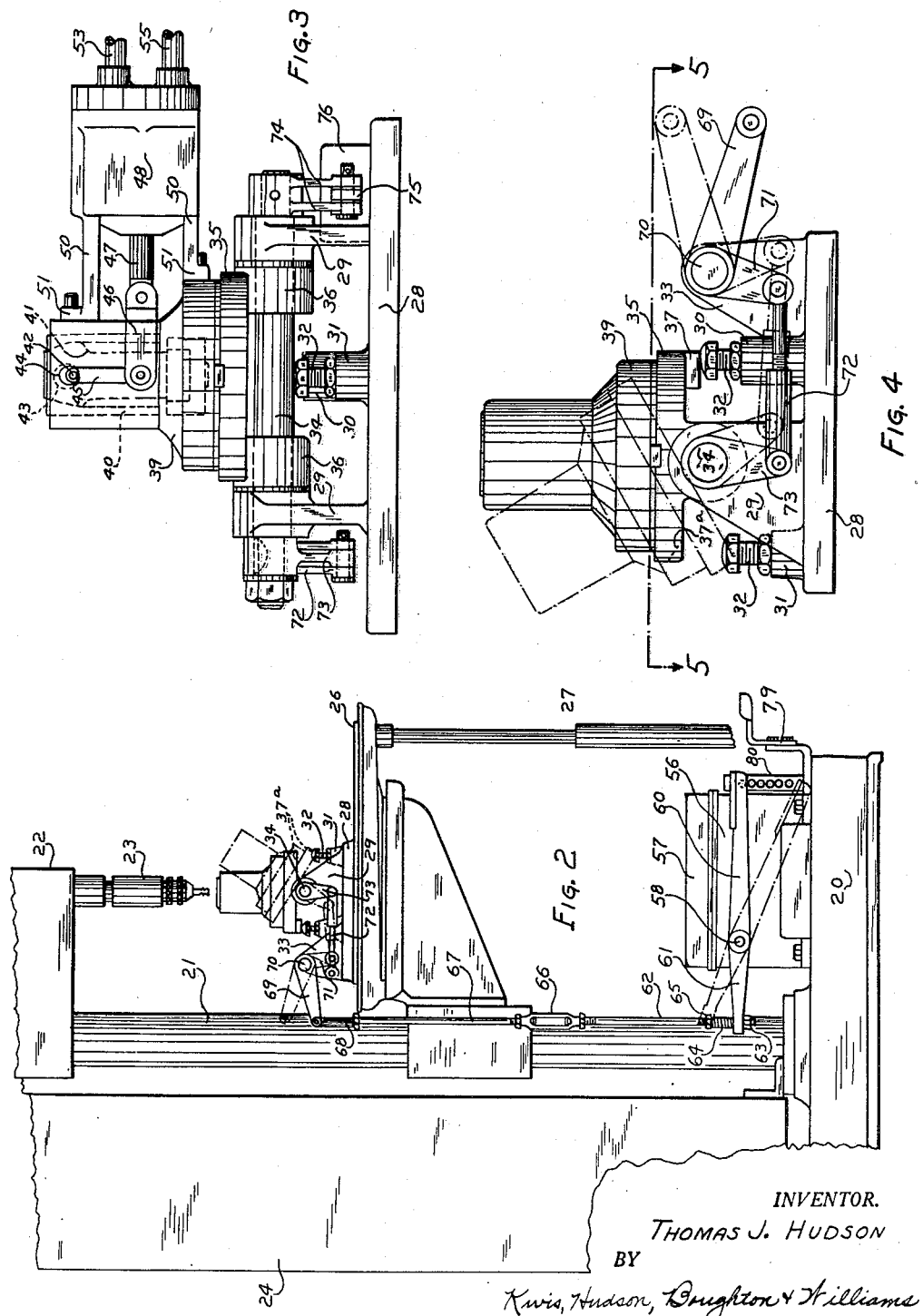

April 17, 1951 T. J. HUDSON 2,549,606
MACHINE TOOL
Filed June 20, 1945 4 Sheets-Sheet 3
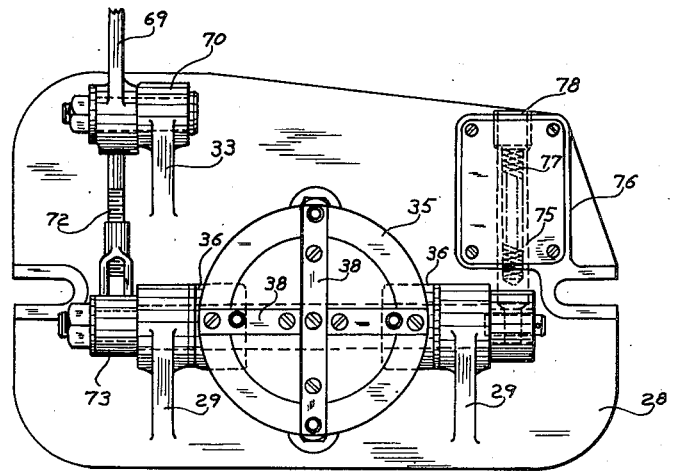
FIG. 5
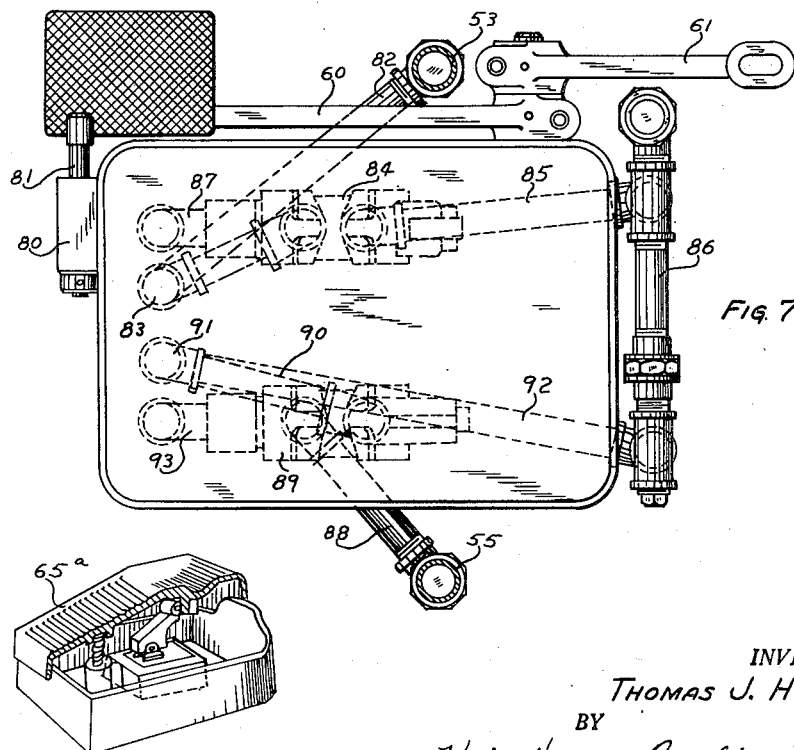
FIG. 7
FIG. 7A
INVENTOR.
THOMAS J. HUDSON
BY
Kwis, Hudson, Broughton & Williams
ATTORNEYS April 17, 1951     T. J. HUDSON     2,549,606
MACHINE TOOL Filed June 20, 1945     4 Sheets-Sheet 4

INVENTOR.
THOMAS J. HUDSON
BY
Kwis, Hudson, Boughton & Williams
ATTORNEYS

Patented Apr. 17, 1951

2,549,606

UNITED STATES PATENT OFFICE 2,549,606

MACHINE TOOL

Thomas J. Hudson, South Euclid, Ohio, assignor to The Warner & Swasey Company, Cleveland, Ohio, a corporation of Ohio Application June 20, 1945, Serial No. 600,598

17 Claims. (Cl. 10—129)

This invention relates to a machine tool, such as a tapping, threading, drilling or similar machine, and particularly to an attachment for such machine which includes a tiltable work holding fixture.

An object of the invention is to provide an improved machine of the character specified, which is efficient in operation and can be operated with a minimum effort on the part of the operator.

Another object is to provide an attachment for a tapping, threading, drilling or similar machine and which attachment includes a tilting fixture provided with work holding means and mechanism for actuating said tilting fixture and for controlling the operation of the work holding means, with said mechanism preferably but not necessarily also controlling the initiation of the work cycle of the machine.

A further object is to provide in a tapping, threading, drilling or similar machine including a tilting fixture provided with work holding means, a control and actuating mechanism operated by a single manually actuated member and which mechanism operates the tilting fixture, controls the operation of the work holding means and initiates the cycle of operation of the tapping or threading machine, wherefore said machine can be operated with a minimum effort on the part of the operator and said manually actuated member can be foot operated, thus leaving the operator's hands free to load and unload the work, and if necessary to gauge the work.

Another object of the invention is to provide in a tapping, threading, drilling or similar machine improved means for moving the work holding means from beneath the work spindle, thus facilitating the unloading of a finished work piece from the work holding means and the loading of a new work piece therein and also necessitating a minimum clearance limit setting for the work spindle relative to the work piece on its retracting or withdrawing stroke.

A further object is to provide an attachment for a tapping, threading, drilling or similar machine, such as has been heretofore referred to, and wherein the control mechanism of the attachment is interconnected with the regular control of the machine but in such way that when the attachment is employed the control of the machine will be entirely under the control mechanism of the attachment and accidental operation of the regular main control switch of the machine will have no effect.

Further and additional objects and advantages not hereinbefore referred to will become apparent during the detailed description of an embodiment of the invention which is to follow:

Referring to the accompanying drawings illustrating said embodiment of the invention, Fig. 1 is a front elevational view of a machine to which the invention is applied.

Fig. 2 is a side elevational view of a portion of the machine shown in Fig. 1, with the tilting work holding fixture and certain of the parts of the operating mechanism for said fixture indicated in operative or normal position by full lines and in tilted position by dot and dash lines.

Fig. 3 is an enlarged front elevational view of that part of the attachment which includes the tilting fixture and shows said fixture in vertical or operative position.

Fig. 4 is a side elevational view of that portion of the attachment shown in Fig. 3 and is taken looking from the left hand side of Fig. 3, with the tilting fixture shown in vertical or operative position by full lines and in tilted position by dot and dash lines.

Fig. 5 is a plan view taken on line 5—5 of Fig. 4, looking in the direction of the arrows, with the work holding or gripping means of the fixture removed.

Fig. 7 is a top plan view of the box containing the actuating and control mechanism of the attachment, with certain of the parts of the mechanism indicated by dotted lines.

Fig. 7a is a cross section of the foot operated main control switch.

Figure 8:
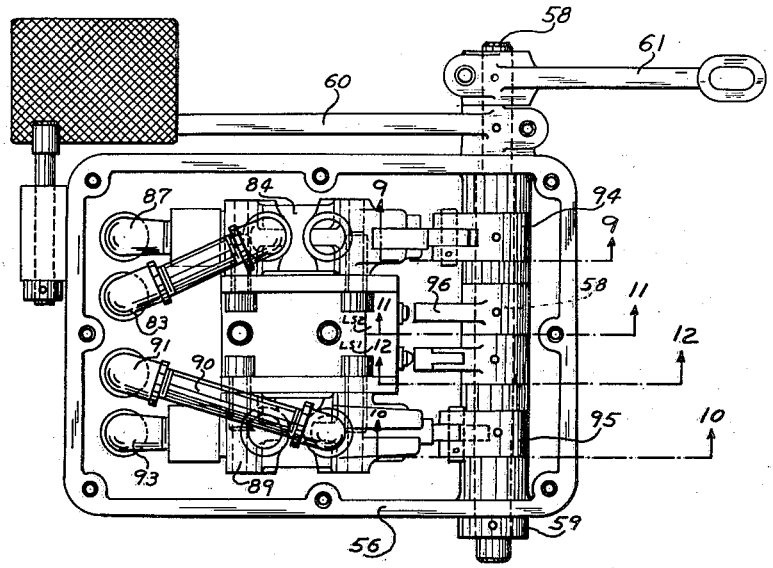
Fig. 8 is a top plan view of the box shown in Fig. 7 but with the top cover removed.
Figure 9:
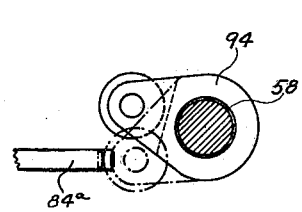

Fig. 9 is a fragmentary sectional view taken on line 9—9 of Fig. 8, looking in the direction of the arrows, and shows in full lines the relationship between an actuator and a valve actuating plunger when the foot control pedal of the attachment is in fully raised or normal position and the fixture is in operative position and in dot and dash lines the relationship therebetween when the foot pedal is in depressed or lowered position and the fixture is tilted.

Figure 10:
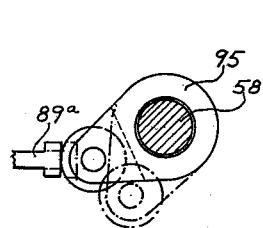

Fig. 10 is a fragmentary sectional view taken substantially on line 10—10 of Fig. 8, looking in the direction of the arrows, and shows by full lines the relationship between an actuator and a valve actuating plunger of the mechanism when the foot pedal is in raised or normal position and by dot and dash lines the relationship therebetween when the foot pedal is in depressed position.

Figure 11:
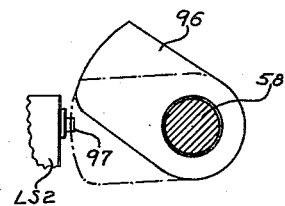

Fig. 11 is a fragmentary sectional view taken substantially on line 11—11 of Fig. 8, looking in the direction of the arrows, and shows by full lines the relationship between an actuator cam and a switch actuating plunger when the foot pedal is in raised or normal position and by dot and dash lines such relationship when the foot pedal is in depressed position.

Figure 12:
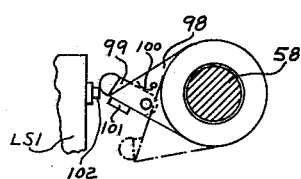

Fig. 12 is a fragmentary sectional view taken substantially on line 12—12 of Fig. 8, looking in the direction of the arrows and discloses by full lines the relationship between a switch actuating lever provided with a pivoted trigger and a switch actuating plunger when the foot pedal is in raised or normal position and by dot and dash lines such relationship when the foot pedal is in depressed position.

Figure 13:
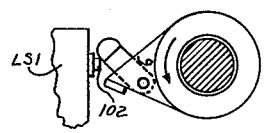

Fig. 13 is a view similar to Fig. 12 but discloses the relationship between the pivoted trigger and the switch plunger during the movement of the foot pedal from raised to depressed position and in which movement said trigger swings about its pivot and does not depress the switch plunger.

Figure 14:
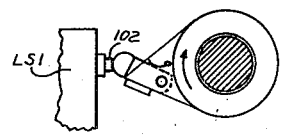
Figure 15:
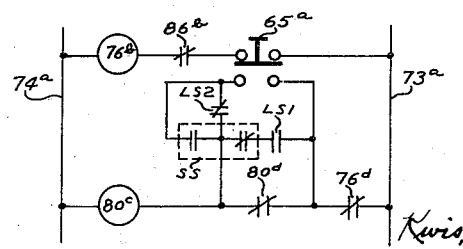

Fig. 14 is a view similar to Figs. 12 and 13 but shows the relationship between the switch lever, its pivoted trigger and the switch plunger during the movement of the foot pedal from depressed position back to raised or normal position and during which movement said trigger momentarily depressed the switch plunger, and Fig. 15 illustrates diagrammatically the arrangement for connecting the switches of the control mechanism in circuit with the main control switch of the machine.

In the drawings the invention is disclosed as applied to a tapping machine, but it will be understood that it is applicable also to a threading, drilling or similar machine.

The machine comprises a base 20 from which upwardly extends the column 21 which supports at its upper end the machine head indicated generally at 22 and including the rotatable tool spindle 23 and the drive thereto. Rearwardly of the column 21 is a vertically extending cabinet 24 which houses the control mechanism for the machine and the driving motor therefor. It will be understood that when the machine is operating the spindle 23 is rotated first in one direction and is moved or fed axially to bring the tool carried by the spindle into engagement with the work piece and after the tapping, threading or drilling operation has been completed the rotation of the spindle is reversed and the spindle is retracted until the tool is clear of the work piece a predetermined distance, whereupon the spindle rotation terminates. The operative steps just referred to are well known in the art and constitute the operative cycle of the machine and various known means may be included in the machine for carrying out this operative cycle automatically as, for instance, the means shown in Bakewell Patent 2,257,364, issued September 30, 1941. However, since the means for carrying out the operative cycle forms per se no part of the present invention it is not deemed necessary to illustrate the same herein, with the exception of indicating the foot operated main control switch 65a (see Fig. 1) mounted on the base 20 and controlling the initiation of the operative cycle which, as stated above, is carried out automatically.

The machine also includes a table 26 which is vertically adjustably supported on the column 21 in any well known or preferred manner well known in the art, while the outer corners of the table 26 are supported by auxiliary vertically adjustable supports 27 also well known in the art and forming no part of the present invention.

The attachment embodying the invention comprises a tilting fixture and work holding or gripping means secured to the table 26 and an operating and control mechanism mounted on the base 20 and operatively connected with said fixture and with the foot operated main control switch 65a of the machine as will be explained in detail hereinafter.

The part of the attachment which is mounted on the table 26 comprises a base plate 28 which is secured in adjusted position on the table in any well known manner as, for instance, by bolts passing through the plate and having T-heads on their lower ends engaging in elongated T-slots formed in the table while clamping nuts are screwed on the bolts and engage the upper side of the plate. The base plate 28 is provided with spaced upstanding bracket arms 29 (see Figs. 3 and 4) located inwardly of but adjacent to the opposite ends of the base plate and provided with aligned bearing bosses. The plate 28 is also provided intermediate the bracket arms 29 and midway of the ends of the plate with upstanding bosses 30 and 31 aligned with each other from front to rear of the plate and which are internally screw threaded and have adjustably screwed therein stop screws 32 and lock nuts therefor to hold said screws in adjusted position, the purpose of which will later be pointed out. The base plate 28 is also provided rearwardly of the left hand bracket arm 29, as viewed in Fig. 2, with an upstanding supporting bracket arm 33 provided with a boss and the purpose of which will soon become apparent.

The bearing bosses of the bracket arms 29 rockably support a shaft 34, the opposite ends of which extend beyond said bearing bosses (see Figs. 3 and 4). A supporting plate 35, in this instance shown as a circular plate, is provided on its underside with downwardly extending bosses 36 mounted on and fixed to the shaft 34 and located respectively adjacent the inner sides of the bearing bosses of the bracket arms 29, as clearly shown in Figs. 3 and 5. The supporting plate 35 is also provided on its underside with an abutment lug 37 adapted to contact the head of the right hand or rear stop screw 32, as viewed in Fig. 4 when the supporting plate is in a horizontal position, i. e., its normal operative position. The supporting plate 35 is also provided with a cutaway recess 37a in its circumference, the inclined wall of which is adapted to engage the head of the left hand or front stop screw 32 as viewed in Fig. 4 when the supporting plate is in its tilted or loading position.

The supporting plate 35 has secured to its upper surface intersecting diametrically extending keys 38 which engage in diametrically extending grooves formed in the lower end of the housing 39 for the work gripping means. The housing 39 is secured to the supporting plate 35 by suitable means such as securing bolts extending through the housing into tapped holes in the supporting plate and said housing is located and held against turning movement relative to the supporting plate by the engagement of the keys 38 in the grooves of the lower end of the housing. The arrangement is such that when the supporting plate and the housing 39 are assembled together they in effect constitute a unitary structure.

The housing 39 includes a lower enlarged portion that is secured to the supporting plate 35 and a reduced upper portion which houses a vertically extending and vertically movable collet actuating sleeve 40 provided adjacent its upper end with an internal conical surface which engages the complementary external conical surface on the spring jawed collet 41 which is held against movement in the housing by means well known in the art. It will be understood that when the sleeve 40 is moved downwardly in the housing 39 the internal conical surface thereof acting on the external conical surface of the collet jaws contracts said jaws into holding gripping engagement with the work piece and, conversely, said sleeve 40 moves upwardly in the housing to allow the spring jaws of the collet to expand and release their grip on the work piece as is well understood in the art. It will also be understood that although a chuck of the spring jaw collet type is disclosed herein other forms of chucks well known in the art might be employed instead.

The upper reduced portion of the housing 39 adjacent to its upper end is provided with diametrically aligned openings which rockably support pins 42 extending into circular diametrically aligned openings 43 formed in the collet actuating sleeve 40. The inner ends of the pins 42 have fixed thereto eccentrics 44 located within the openings 43 and acting when the pins are rocked in one direction to press said actuating sleeve 40 downwardly to close the collet jaws to grip the work piece and when the pins are rocked in the opposite direction, allowing the sleeve 40 to move upwardly in the housing 39 under the spring action of the collet jaws to open said jaws and release the work piece.

The pins 42 are fixedly connected to the upper ends of lever arms 45, the lower ends of which lever arms are pivotally connected to a yoke 46. The yoke 46 is pivotally connected to a piston rod 47 that extends into the cylinder 48 of a fluid motor and is provided with a piston 49 operating within said cylinder (see Fig. 6). The cylinder 48 is supported on the housing 39 by means of extended arms 50 provided at their free ends with segmental shoes 51 engaging and bolted to the reduced upper portion of the housing and to the enlarged lower portion thereof as clearly shown in Fig. 3.

Figure 6:
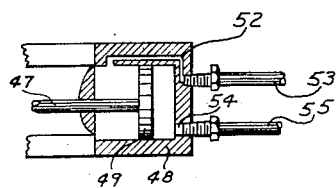
Fig. 6 is a fragmentary sectional view through the fluid motor which operates the work holding or gripping means of the fixture.

Referring to Fig. 6, it will be seen that the cylinder 48 is provided in its wall with a passage 52 communicating with the interior of the cylinder at the left of the piston 49. The passage 52 also communicates with a threaded recess into which is screwed a fitting connected to a conduit 53 which preferably is a flexible conduit. The cylinder 48 is also provided in its end wall with a threaded opening 54 into which is screwed a fitting that is connected to a conduit 55 likewise preferably a flexible conduit. It will be seen that when pressure fluid is admitted to the cylinder through the conduit 53 and passage 52 to the left of the piston, the latter is moved toward the right as viewed in Fig. 6 with the conduit 55 acting as an exhaust, then the levers 45 are rocked in a counterclockwise direction and the sleeve 40 moved downwardly by the eccentrics 44 to contract the spring jaws of the collet into gripping engagement with the work piece. Conversely, when pressure fluid is admitted to the cylinder to the right of the piston 49 through the conduit 55 and is exhausted from the left side of the piston through the passage 52 and conduit 53 the piston 49 will be moved toward the left and the lever arms 45 rocked in a clockwise direction to allow the sleeve 40 to move upwardly in the housing under the spring action of the collet jaws to release the gripping engagement of said jaws on the work piece.

A housing 56 is secured to the upper side of the base 20 by suitable securing means, such as bolts and said housing is provided with a removable cover 57.

Referring to Fig. 8 it will be seen that the housing 56 adjacent its rear end is provided internally with aligned bearing bosses in which is rockably mounted a shaft 58 which extends beyond the sides of the housing. The shaft 58 has fixed to one end externally of one side of the housing 56 a collar 59 while the portion of the shaft which extends beyond the opposite side of the housing is of reduced diameter and has fixed thereto the hub of a foot pedal 60 which projects forwardly of the outer side of the housing. The hub of the foot pedal 60 and the collar 59 hold the shaft 58 against axial movement in the housing. A lever arm 61 has a hub formed at one end thereof which is mounted on and fixed to the reduced end of the shaft 58 outwardly of the hub of the foot pedal 60, wherefore said shaft, foot pedal 60 and lever arm 61 rock as a unit.

The free rear end of the lever arm 61 is provided with an opening through which extends a rod 62 with the lower threaded end of the rod 62 provided with a nut 63 engaging the underside of the lever arm 61 (see Fig. 2). The rod 62 above the lever arm 61 has a coil spring 64 mounted thereon and said spring abuts against the upper side of the end of the lever arm 61 and against an adjustable nut 65 carried by the rod. The rod 62 is adjustably screwed into one end of a turn buckle 66 while the opposite end of said turn buckle has adjustably screwed into it the lower end of a rod 67. The upper end of the rod 67 has adjustably connected to it a yoke connecting member 68 which straddles and is pivotally connected to one end of a lever arm 69. The lever arm 69 is provided with a hub portion that is rockably mounted on a pin 70 carried in the boss of the supporting bracket arm 33 and the hub of said lever arm 69 is provided with a downwardly extending preferably integral lever arm 71 (see Fig. 4). The lower free end of the lever arm 71 is pivotally connected to one end of an adjustable link 72, the opposite end of which link is provided with a fork which straddles and is pivotally connected to the lower free end of a lever arm 73, the hub of which is mounted upon and keyed to the rockable shaft 34.

The end of the shaft 34 opposite to the end on which the lever arm 73 is keyed has fixed thereto outwardly of the bearing boss of the right hand supporting bracket arm 29 as viewed in Fig. 3, the hub of a double armed lever 74. The double armed lever 74 extends downwardly and the spaced arms thereof straddle and are pivotally connected to one end of a plunger 75 and which plunger extends into and is slidably guided by a plunger housing 76 secured to the base plate 28 (see Fig. 5). The plunger 75 is provided with a recess containing a coil spring 77 which abuts at one end the end of the recess in the plunger and at its opposite end engages a suitable fixed abutment, such as an adjustable screw plug 78 carried by the housing 76, as will be well understood. It will be seen that when the fixture is in the position indicated in full lines in Fig. 2 with the housing 39 extending vertically and in alignment with the tool spindle 23 the foot pedal 60 is in its elevated or full line position of Fig. 2. At this time the abutment lug 37 on the underside of the supporting plate 35 is in engagement with the head of the rear adjustable stop screw 32, as clearly shown in Figs. 2 and 4.

It will further be noted that if the operator depresses the foot pedal 60 from the full line position of Fig. 2 to the dot and dash line position thereof the lever arm 61 is rocked in a clockwise direction (as viewed in Fig. 2), compressing the spring 64 and then raising the rods 62 and 67 to rock the lever arms 69 and 71 and through the link 72 to rock the lever arm 73, with a resultant rocking movement of the shaft 34 to tilt the fixture from the full line position of Fig. 2 to the dot and dash line position thereof, at which time the cutaway portion 37a of the circumference of the supporting plate 35 will be in engagement with the head of the front adjusting screw 32 mounted in the boss 31. When the fixture is in the tilted or dot and dash line position of Figs. 2 and 4 it is out of alignment with the work spindle 23 and in a position where the finished work piece can be unloaded from and a new work piece loaded into the collet chuck 41. The rocking or tilting movement of the fixture from the full line position to the dot and dash line position of Figs. 2 and 4 has also caused rocking movement to be imparted to the double armed lever 74 and the plunger 75 to be moved inwardly of its housing, compressing the spring 77.

As soon as the operator releases the pressure of his foot on the depressed foot pedal 60, the compressed spring 77 acts to move the plunger 75 outwardly and through the double armed lever 74 to rock the shaft 34 in a direction to move the fixture from the dot and dash line position of Figs. 2 and 4 into the full line position thereof. This rocking movement of the shaft 34 is imparted to the lever arm 73, link 72 and lever arms 71 and 69 to move the same from the dot and dash line position of Figs. 2 and 4 into the full line position thereof, with the result that the rods 67 and 62 move downwardly and through the compressed spring 64 rock the lever arm 61, foot pedal 60 and shaft 58 in a counterclockwise direction, as viewed in Fig. 2. The downward movement of the rods 72 and 67 is sufficient to almost but not quite restore the foot pedal 60 to its normal full line position, it being noted that the final movement of the foot pedal 60 to its normal position is effected by the expansion of the compressed spring 64 acting on the lever arm 61 after the rods 62 and 67 have finished their downward movement. The purpose of providing the spring 64 for imparting the final increment of return movement of the foot pedal 60 to normal position will be explained hereinafter in connection with the explanation of a certain control switch contained within the housing 56.

The base 20 is provided with a heel rest 79 for the operator and there is also provided an upstanding bar 80 having a plurality of vertically spaced openings into which can be manually inserted a pin 81 to lock the foot pedal in lowered position when desired as, for example, for setup purposes, with the particular opening in the bar 80 into which the pin 81 is inserted depending upon the degree of inclination to which the fixture has been tilted as determined by the adjustment of the stop screw 32 carried by the boss 31.

The construction is such that the tilting of the fixture from its normal position to its tilted position and the restoration of the same from its tilted position to its normal position automatically effects the opening and closing of the jaws of the collet chuck and the initiation of the operative cycle of the machine without requiring the operator to do anything more than merely depress the foot pedal 60 and allow the same to return to its normal raised position. The mechanism whereby this is accomplished will now be explained.

The conduit 53 extends to and is connected with a pipe 82 which extends beneath the housing 56 and then by means of an elbow 83 through the bottom wall of the housing and is connected with a valve 84. The valve 84 is connected with a pipe 85 extending beneath the housing and in turn connected with a pipe 86 that extends to a supply source of pressure fluid. The valve 84 is also connected to atmosphere through an exhaust pipe 87 (see Figs. 6 and 7). The valve 84 is normally open, that is pressure fluid is flowing through the valve from the inlet pipe 85 and outwardly of the valve to the conduit 53 to normally maintain the piston 49 in its chuck closed position wherein the collet jaws are gripping the work.

The conduit 55 extends to and is connected with a pipe 88 that extends beneath the housing 56 and passes through the bottom wall thereof and is connected with a valve 89. The valve 89 is connected with the supply source of pressure fluid by a pipe 90 located within the housing and connected by an elbow 91 extending through the bottom wall of the housing and in turn connected with a pipe 92 extending beneath the housing and connected to the pipe 86. The valve 89 can be placed in communication with atmosphere through an exhaust pipe 93. The valve 89 when the fixture is in its operative vertical position is closed, that is no pressure fluid is flowing through the valve from the supply source and the valve 89 is exhausting to atmosphere the pressure fluid flowing into the valve through the conduit 55.

The shaft 58 has fixed to it to rock therewith an actuator 94 which carries a roller adapted to engage and depress the actuating plunger 84a of the normally open valve 84 to close said valve to stop the flow of pressure fluid thereto from the supply source and to allow the pressure fluid flowing into the valve from the conduit 53 to be exhausted to atmosphere (see Figs. 8 and 9). When the fixture is in its normal operative position and the foot pedal 60 is in its normal raised position the valve actuator 94 is in the full line position of Fig. 9. However, when the foot pedal 60 is depressed to tilt the fixture the actuator 94 moves to the dot and dash line position of Fig. 9 and the roller of the actuator engages the actuating plunger 84a of the valve 84 and moves the same toward the left as viewed in Fig. 9 to close the valve 84.

The shaft 58 has fixed thereto a similar actuator 95 and which is normally in the full line position of Fig. 10, at which time the actuating plunger 89a of the valve 89 is held depressed to maintain the valve 89 closed as above referred to. However, when the foot pedal 60 is depressed to tilt the fixture, the roller of the actuator 95 moves out of engagement with the end of the valve plunger 89a simultaneously with the engagement of the valve plunger 84a by the roller of the actuator 94, with the result that when the valve 84 is closed during the tilting of the fixture the valve 89 is opened and pressure fluid is admitted to the cylinder 48 through the conduit 55 and is exhausted therefrom through the conduit 53 and the piston 49 moves toward the left, as viewed in Fig. 6, to allow the sleeve 40 to move upwardly under the opening action of the collet jaws to release their gripping engagement with the work piece. The collet jaws remain in released position so long as the operator maintains the foot pedal 60 depressed and the fixture is in tilted position. As soon as the operator releases the pressure on the foot pedal 60 the fixture returns to its normal operative position as previously described and during this period the roller of the actuator 94 disengages from the valve plunger 84a and the valve 84 opens, while the roller of the actuator 95 engages the valve plunger 89a to depress the same and close the valve 89. As soon as the valve 84 opens and the valve 89 closes the pressure fluid enters the cylinder 48 through the conduit 53 and exhausts therefrom through the conduit 55 and the piston 49 is moved toward the right as viewed in Fig. 6 to close the collet jaws on a new work piece which the operator has inserted in the collet after removing the finished work piece.

The housing 56 contains a normally closed limit switch LS2 and also a normally open limit switch LS1. Reference to Fig. 15 will show that the normally open limit switch LS1 is in the control circuit for the machine in parallel with the normally open foot operated main control switch 65a. The diagram of Fig. 15 will also show that normally closed limit switch LS2 is in said circuit in series with the foot operated main control switch 65a. Consequently when limit switch LS2 is opened the main control switch 65a is ineffective in initiating the operative cycle of the machine but said operative cycle can be initiated at such time by closing the normally open limit switch LS1.

The shaft 58 has fixed thereto a switch actuator cam 96 which in the normal position of the fixture and when the foot pedal 60 is in its normal raised position is out of engagement with the actuating plunger 97 of limit switch LS2 (see Figs. 8 and 11). When the foot pedal 60 is depressed to tilt the fixture the actuator cam 96 moves into engagement with the plunger 97 to depress the same and open the normally closed limit switch LS2, thus cutting out of the circuit the foot operated main control switch 65a. The switch actuator 96 maintains limit switch LS2 open during the entire time that the fixture is tilted and consequently even should the operator inadvertently depress and close foot operated main control switch 65a during this time the operative cycle will not be initiated.

The shaft 58 has fixed thereto a switch actuating lever 98 which is provided with a forked portion in which is pivotally mounted a trigger 99 normally held by a spring 100 carried by the lever 98 in engagement with a cross-bar 101 extending between the tines of the forked portion of the lever 98 and limiting the movement of the trigger 99 in one direction of movement. When the foot pedal 60 is in its normal raised position and the fixture is in its vertical operative position the trigger 99 is just contacting but not depressing the actuating plunger 102 of normally open limit switch LS1, see Fig. 12. When the operator depresses foot pedal 60 and the shaft 58 is rocked from the position shown in Fig. 12 to the position shown in Fig. 13 the trigger 99 is moved by its engagement with the pluger 102 against the action of the spring 100 from the position of the trigger as shown in Fig. 12 to the position thereof as shown in Fig. 13 but the switch LS1 is not closed. The further rocking movement of the shaft 58 in the fixture tilting direction causes the trigger 99 to slide over the plunger 102 without depressing the same until it has passed the plunger, whereupon the spring 100 returns the trigger into engagement with the cross-bar 101 and the trigger and actuating member 98 are in the dot and dash line position of Fig. 12. At this time the fixture is fully tilted and although limit switch LS2 has been opened, normally open limit switch LS1 remains open and the operative cycle of the machine cannot be initiated. When the operator releases the pressure of his foot on the foot pedal 60 and the fixture returns to its normal operative vertical position and the actuating lever 98 and trigger 99 move in a clockwise direction, as viewed in Fig. 14, the trigger which is in engagement with the cross-bar 101 contacts the plunger 102 of the switch LS1 and momentarily depresses the plunger to close switch LS1 and initiate the operative cycle of the machine. This closing of the switch LS1 occurs when the fixture has been fully restored to its normal vertical operating position but just prior to the full restoration of the foot pedal 60 to its normal raised position. The additional movement imparted to the foot pedal 60 by the expansion of the spring 64 after the fixture has been restored to its operative position moves the actuating lever 98 and the trigger 99 from the position shown in Fig. 14 to the full line position of Fig. 12. It will be understood that limit switch LS1 is a momentary contact switch which simply initiates the operative cycle and that said cycle thereafter is automatically controlled by suitable control means as, for example, the control circuit and switches disclosed in said Bakewell Patent 2,257,364 hereinbefore referred to.

Figure 1:
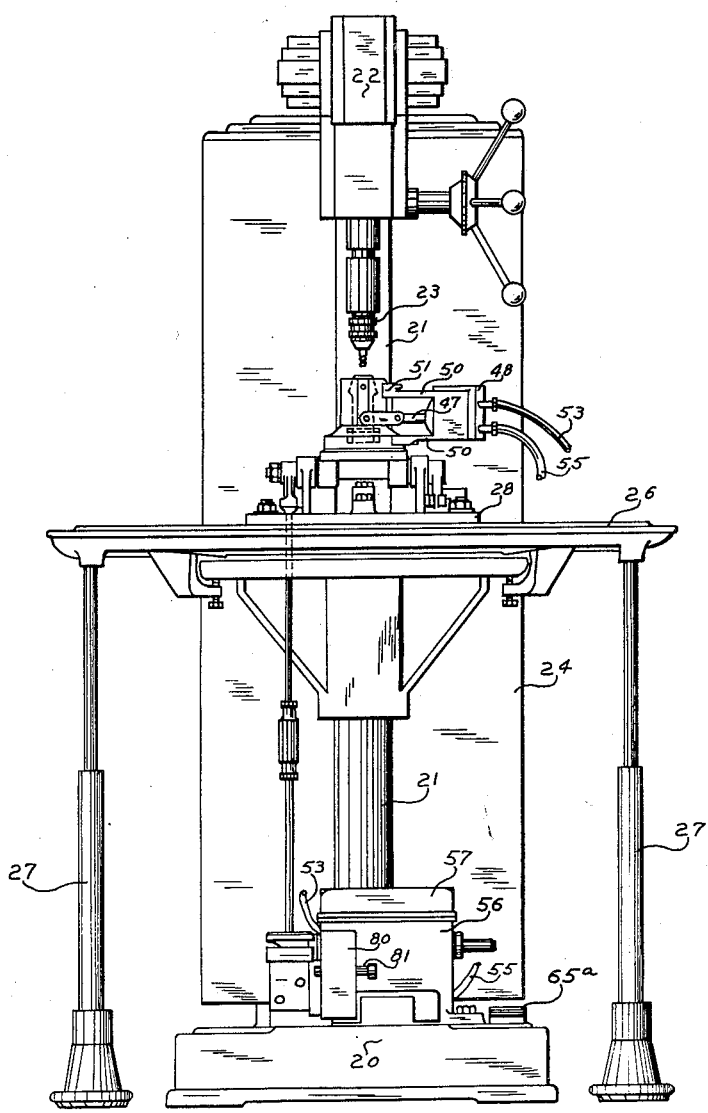

The diagram of Fig. 15 corresponds to a portion of the diagram shown in Fig. 1 of said Bakewell Patent 2,257,364, except that the limit switches LS1 and LS2 and the double throw switch SS have been included in the diagram. With the exception of the limit switches LS1 and LS2 and the double throw switch SS, the elements of the diagram of Fig. 15 have been given the same reference numbers as in said patent but distinguished therefrom by small letter exponents, that is, the reference numberals 73, 74, 76, 86a, 65, 80, 80a and 76b of the patent diagram correspond, respectively, to numerals 73a, 74a, 76c, 86b, 65a, 80c, 80d and 76d of Fig. 15.

In order that the machine can be operated in the regular way without using the novel tilting fixture disclosed herein a double throw single pole switch SS is provided in the circuit and said switch can be manually operated to cut switch LS1 out of the circuit and to by-pass switch LS2 (see Fig. 15), wherefore the main control switch 65a controls the initiation of the operative cycle and should the operator accidentally depress the foot pedal 60 no effect will be had on the control circuit.

From the foregoing description it will have been seen that the operator can actuate the tilting fixture with one foot by depressing the foot pedal 60 and releasing the same. It will also be observed that the depression of the foot pedal 60 automatically controls the release of the work gripping means and automatically cuts out of the control circuit and renders ineffective the foot operated main control switch 65a by opening the normally closed switch LS2, thus eliminating any danger of the machine being inadvertently operated when the fixture is tilted. In addition it will have been seen that when the operator releases the pressure of his foot on the foot pedal 60 and the latter returns to raised normal position, the tilting fixture is restored to operative position and the work gripping means is automatically actuated into work gripping engagement while the operative cycle of the machine is initiated by closing the switch LS1. Inasmuch as the operator effects all of these operations and controls by one foot his hands are free to load and unload the work pieces and to gauge the same if required. Also the tilting fixture which moves the work piece out of alignment with the tool spindle enables the retracting movement of the tool spindle to be reduced in amplitude, since it is not necessary to clear the tool a great distance from the finished work piece in order to remove said work piece from the chuck. The use of the attachment embodying the invention consequently greatly improves the efficiency and speed of operation of the machine and fully accomplishes the objects hereinbefore specified.

Although a preferred embodiment of the invention has been illustrated and described herein it will be understood that the invention is susceptible of various modifications and adaptations within the scope of the appended claims.

Having thus described my invention, I claim:

1. In a machine tool having a work supporting table and a rotating tool spindle relatively movable axially toward and away from said table; a housing connected with said table and normally axially aligned with said spindle but movable on said table to a misaligned position, work gripping means carried by said housing and movable therewith relative to said table and adapted to grip a work piece when said housing is in normal spindle aligned position, fluid operated means carried by said housing for actuating said work gripping means, and valve means for controlling said fluid operated means; a manually operated member, mechanical operative connections between said member and said housing for moving the latter from its normal spindle aligned position to said misaligned position when said member is moved in one direction, spring means supported by said table and operatively associated with said housing and said operative connections for moving said member in the opposite direction and for moving said housing from misaligned position to normal aligned position, and operative connections between said member and said valve means for actuating the latter during said movement of said member in one direction to effect release actuation of said work gripping means and to actuate said valve means during said movement of said member in the opposite direction to effect work gripping actuation of said work gripping means.

2. In a machine tool having a work supporting table and a rotating tool spindle relatively movable axially toward and away from said table; a housing rockably connected with said table and normally axially aligned with said spindle during machining operations of the work pieces but rockable to a misaligned tilted position for loading and unloading the work pieces, work gripping means carried by said housing and adapted to grip a work piece when said housing is in normal spindle aligned position, fluid operated means carried by said support and for actuating said work gripping means, and valve means for controlling said fluid operated means; a manually operated member, operative connections between said member and said housing for rocking the latter from its normal spindle aligned position to said misaligned tilted position when said member is moved in one direction, spring means operatively associated with said operative connections for moving said member in the opposite direction and for rocking said housing from misaligned tilted position to normal aligned position, and operative connections between said member and said valve means for actuating the latter during said movement of said member in one direction to effect release actuation of said work gripping means and during said movement of said member in the opposite direction to effect work gripping actuation of said work gripping means.

3. In a machine tool of the type having a support, a work supporting table on said support, a tool spindle carried by said support and which during the operative work cycle of the machine first rotates in one direction and moves axially relatively toward said table and then rotates in the opposite direction and moves axially relatively away from said table to clear the work piece and then has its rotation terminated, and electrical means carried by said support for initiating said operative cycle and for carrying the same to completion automatically and including electrical control circuits; a housing connected with said table and normally axially aligned with said spindle but movable to a misaligned position and provided with work gripping means; a manually operated member on said support, mechanical operative connections between said member and said housing for moving the latter from its normal spindle aligned position to said misaligned position when said member is moved in one direction and functioning to move the housing back to normal spindle aligned position during movement of said member in the opposite direction, switch means carried by said support and electrically and operatively associated with said electrical control circuits and when actuated initiating said operative cycle, and operative connections between said member and said switch means and carried by said circuit for actuating said switch means during movement of said member in said opposite direction.

4. In a machine tool of the type having a work supporting table, a tool spindle which during the operative work cycle of the machine first rotates in one direction and moves axially relatively toward said table and then rotates in the opposite direction and moves axially relatively away from said table to clear the work piece and then has its rotation terminated, and electrical means for carrying out said operative cycle automatically and including a manually operated switch for initiating said cycle; a housing connected with said table and normally axially aligned with said spindle but movable to a misaligned position and provided with work gripping means; a manually operated member, operative connections between said member and said housing for moving the latter from its normal spindle aligned position to said misaligned position when said member is moved in one direction and functioning to move the housing back to normal spindle aligned position during movement of said member in the opposite direction, a normally closed switch in series with said manually operated switch and acting when open to render said latter switch ineffective, a normally open switch electrically and operatively associated with said electrical means and when actuated initiating said operative cycle, and operative connections between said member and said normally closed switch and said normally open switch and functioning during movement of said member in said one direction to open said normally closed switch and during movement of said member in said opposite direction to close said normally open switch to initiate said operative cycle.

5. In a machine tool of the type having a work supporting table, a tool spindle which during the operative work cycle of the machine first rotates in one direction and moves axially relatively toward said table and then rotates in the opposite direction and moves axially relatively away from said table to clear the work piece and then has its rotation terminated, and electrical means for carrying out said operative cycle automatically and including a manually actuated switch for initiating said cycle; a housing rockably connected with said table and normally axially aligned with said spindle but rockable to a misaligned tilted position and provided with work gripping means; a manually operated member, operative connections between said member and said housing for rocking the latter from its normal spindle aligned position to said misaligned tilted position when said member is moved in one direction, spring means operatively associated with said operative connections and acting to rock said housing from tilted position to normal position and to move said member in the opposite direction, a normally closed switch in series with said manually operated switch and acting when open to render said latter switch ineffective, a normally open switch operatively and electrically associated with said electrical means and acting when closed to initiate said operative cycle, and operative connections between said member and said normally closed switch and said normally open switch and acting during movement of said member in said one direction to open said normally closed switch and during movement of said member in said opposite direction to close said normally open switch.

6. In a machine tool of the type having a work supporting table, a tool spindle which during the operative work cycle of the machine first rotates in one direction and moves axially relatively toward said table and then rotates in the opposite direction and moves axially relatively away from said table to clear the work piece and then has its rotation terminated, and electrical means for initiating said operative cycle and for carrying the same to completion automatically; a housing connected with said table and normally axially aligned with said spindle but movable to a misaligned position, work gripping means carried by said housing and adapted to grip a work piece when said housing is in normal spindle aligned position, and actuating means for said work gripping means; a manually operated member, operative connections between said member and said housing for moving the latter from its normally spindle aligned position to said misaligned position when said member is moved in one direction, operative connections between said member and said actuating means controlling the latter during said movement of said member in one direction to effect release actuation of said work gripping means, switch means electrically and operatively associated with said electrical means and when actuated initiating said operative cycle, and operative connections between said member and said switch means for actuating the latter during movement of said member in the opposite direction.

7. In a machine tool of the type having a support, a work supporting table, a tool spindle carried by said support and which during the operative work cycle of the machine rotates in one direction and moves axially relatively toward said table and then rotates in the opposite direction and moves axially relatively away from said table to clear the work piece and then has its rotation terminated; and electrical means carried by said support for initiating said operative cycle and for carrying the same to completion automatically; a housing connected with said table and normally axially aligned with said spindle but movable to a misaligned position, work gripping means carried by said housing and adapted to grip a work piece when said housing is in normal spindle aligned position, and actuating means for said work gripping means; a manually operated member, operative connections between said member and said housing for moving the latter from its normally spindle aligned position to said misaligned position when said member is moved in one direction, spring means supported by said table and operatively associated with said housing and said operative connections for moving said housing from its misaligned position to its normal aligned position and for moving said member in the opposite direction, operative connections between said member and said actuating means controlling the latter during said movement of said member in one direction to effect release actuation of said work gripping means and during said movement of said member in the opposite direction to effect work gripping actuation of said work gripping means, switch means carried by said support and electrically and operatively associated with said electrical means and when actuated initiating said operative cycle, and operative connections between said member and said switch means for actuating the latter during movement of said member in said opposite direction.

8. In a machine tool of the type having a work supporting table, a tool spindle which during the operative work cycle of the machine first rotates in one direction and moves axially relatively toward said table and then rotates in the opposite direction and moves axially relatively away from said table to clear the work piece and then has its rotation terminated, and electrical means for carrying out the operative cycle automatically and including a manually operated switch for initiating said operative cycle; a housing rockably connected with said table and normally axially aligned with said spindle but rockable to a tilted misaligned position, work gripping means carried by said housing and adapted to grip a work piece when said housing is in normal spindle aligned position, and fluid operated means for actuating said work gripping means; a manually operated member, operative connections between said member and said housing for rocking the latter from its normal spindle aligned position to said tilted misaligned position when said member is moved in one direction, spring means supported by said table and operatively associated with said operative connections for moving said housing from tilted position to normal position and for moving said member in the opposite direction, valve means for controlling the actuation of said fluid operated means, operative connections between said member and said valve means and acting during the movement of said member in said one direction to actuate said valve means to effect release actuation of said work gripping means and during movement of said member in said opposite direction to effect work gripping actuation of said work gripping means, a normally closed switch in series with said manually operated switch and acting when open to render said latter switch ineffective, a normally open switch in parallel with said manually operated switch and electrically associated with said electrical means and acting when closed to initiate said operative cycle, and operative connections between said member and said normally closed switch and said normally open switch and acting during movement of said member in said one direction to open said normally closed switch and during movement of said member in said opposite direction to close said normally open switch.

9. In a machine tool of the type having a work supporting table, a tool spindle which during the operative work cycle of the machine first rotates in one direction and moves axially relatively toward said table and then rotates in the opposite direction and moves axially relatively away from said table to clear the work piece and then has its rotation terminated, an electrical means for carrying out the operative cycle automatically and including a manually operated switch for initiating said operative cycle; a housing movably connected with said table and normally axially aligned with said spindle but movable to a misaligned position, work gripping means carried by said housing and adapted to grip a work piece when said housing is in normal spindle aligned position, and fluid operated means carried by said housing for actuating said work gripping means; a manually operated member, operative connections between said member and said housing for moving the latter from its normal spindle aligned position to said misaligned position when said member is moved in one direction, spring means supported by said table and operatively associated with said operative connections for moving said housing from misaligned position to normal position and for moving said member in the opposite direction, valve means for controlling the actuation of said fluid operated means, operative connections between said member and said valve means and acting during the movement of said member in said one direction to actuate said valve means to effect release actuation of said work gripping means and during movement of said member in said opposite direction to effect work gripping actuation of said work gripping means, a normally closed switch in series with said manually operated switch and acting when open to render said later switch ineffective, a normally open switch in parallel with said manually operated switch and electrically associated with said electrical means and acting when closed to initiate said operative cycle, and operative connections between said member and said normally closed switch and said normally open switch and acting during movement of said member in said one direction to open said normally closed switch and during movement of said member and in said opposite direction to close said normally open switch.

10. In a machine tool having a work holder and a rotating tool holder relatively movable axially toward and from said work holder; said work holder being normally aligned with said tool holder for working operations on a work piece but tiltable to a misaligned position for loading and unloading the work piece, work gripping means carried by said work holder to move relative thereto to grip and release a work piece and movable therewith when the work holder is moved to said misaligned position to position the work gripping means entirely out of alignment with the tool holder to facilitate insertion and removal of a work piece and movable with the work holder when the latter is moved to aligned position to locate the work piece gripped by the work gripping means in alignment with the tool holder, and actuating means for said work gripping means and carried by said work holder; a manually operated member, operative connections between said member and said work holder for tilting the latter from its normal tool holder aligned position to said misaligned position when said member is moved in one direction, spring means operatively associated with said work holder and energized when the latter is moved to tilted misaligned position and acting when said member is released by the operator to rock said work holder to normal aligned position and move said member in the opposite direction, and operative connections between said member and said actuating means controlling the latter during said movement of said member in one direction to effect work piece release actuation of said work gripping means and during said movement of said member in the opposite direction to effect work piece gripping actuation of said work gripping means.

11. In a machine tool having a work holder and a rotating tool holder relatively movable axially toward and away from said work holder; said work holder being normally axially aligned with said tool holder for machining operations on a work piece but movable to a misaligned position for loading and unloading the work pieces, work gripping means carried by said work holder to move relative thereto to grip and release a work piece and movable therewith when the work holder is moved to said misaligned position to position the work gripping means entirely out of alignment with the tool holder to facilitate easy insertion and removal of a work piece and movable with the work holder when the latter is moved to aligned position to locate the work piece gripped by the work gripping means in alignment with said tool holder, power operated actuating means for said work gripping means and carried by said work holder, and control means for said power operated means; a manually operated member, operative connections between said member and said work holder for moving the latter from its normal tool holder aligned position to said misaligned position when said member is moved in one direction, spring means operatively associated with said work holder and energized when the latter is moved to misaligned position and acting when said member is released by the operator to move said work holder to normal aligned position and to move said member in the opposite direction, and operative connections between said member and said control means for actuating the latter during said movement of said member in one direction to effect operation of said actuating means to release said work gripping means and during said movement of said member in the opposite direction to effect operation of said actuating means to cause said work gripping means to grip the work piece.

12. In a machine tool of the type having a work supporting table and a rotating tool spindle relatively movable axially toward and away from said table; a housing rockably connected with said table and normally axially aligned with said spindle during machining operations on a work piece but tiltable to a misaligned position for loading and unloading the work pieces, work gripping means carried by said work holder to move relative thereto to grip and release a work piece and movable therewith when the work holder is moved to said misaligned position to position the work gripping means entirely out of alignment with the tool holder to facilitate easy insertion and removal of a work piece and movable with the work holder when the latter is moved to aligned position to locate the work piece gripped by the work gripping means in alignment with said tool holder, power actuating means for said work gripping means and carried by said housing, and control means for said power operated actuating means; a manually operated member, operative connections between said member and said housing for rocking the latter from its normal spindle aligned position to said tilted misaligned position when said member is moved in one direction, spring means operatively associated with said work holder and energized when the latter is rocked to tilted misaligned position and acting when said member is released by the operator to rock said work holder to normal aligned position and to move said member in the opposite direction, and operative connections between said member and said control means for actuating the latter during said movement of said member in one direction to effect operation of said actuating means to release said work gripping means and during said movement of said member in the opposite direction to effect operation of said actuating means to cause said work gripping means to grip the work piece.

13. In a machine tool having a work holder and a rotatable tool holder relatively movable axially toward and away from said work holder; said work holder being normally axially aligned with said tool holder but movable to a misaligned position, work gripping means carried by said work holder to move relative thereto to grip and release a work piece and movable therewith when the work holder is moved to said misaligned position to position the work gripping means entirely out of alignment with the tool holder to facilitate easy insertion and removal of a work piece and movable with the work holder when the latter is moved to aligned position to locate the work piece gripped by the work gripping means in alignment with said tool holder, and actuating means for said work gripping means and carried by said work holder; a manually operated member normally located in a predetermined position, operative connections between said member and said work holder for moving the latter from its normal tool holder aligned position to said misaligned position when said member is moved from its normal predetermined position, spring means operatively associated with said work holder and energized when the latter is moved to misaligned position and acting when said member is released by the operator to move said work holder to normal aligned position and to move said member toward its normal predetermined position, additional spring means operatively associated with said operative connections and acting in series with said first spring means and functioning to complete the return movement of said member to its normal predetermined position, and operative connections between said member and said actuating means controlling the latter during movement of said member away from its normal predetermined position to effect release actuation of said work gripping means and during movement of said member toward its normal predetermined position to effect work gripping actuating of said work gripping means.

14. A machine tool as defined in claim 13 and wherein said work holder is tiltable from its normally axially aligned position with respect to said tool holder to a misaligned position and the operative connections between said member and said work holder function to tilt the latter from its normal position to its misaligned position when said member is moved from its normal predetermined position.

15. In a machine tool having a work holder and a rotating tool holder relatively movable axially toward and away from said work holder but normally axially aligned with said tool holder but movable to a misaligned position, work gripping means carried by said work holder to move relative thereto to grip and release a work piece and movable therewith when the work holder is moved to misaligned position to position the work gripping means entirely out of alignment with the tool holder to facilitate easy insertion and removal of a work piece and movable with the work holder when the latter is moved to aligned position to locate the work piece gripped by the work gripping means in alignment with said tool holder, power operated actuating means for said work gripping means carried by said work holder, and control means for said power operated means; a manually operated member normally located in a predetermined position, operative connections between said member and said work holder for moving the latter from its normally tool holder aligned position to said misaligned position when said member is moved from its normally predetermined position, spring means operatively associated with said work holder and energized when the latter is moved to misaligned position and acting when said member is released by the operator to move said work holder to normal aligned position and to move said member toward its normal predetermined position, additional spring means operatively associated with said operative connections and acting in series with said first named spring means and functioning to complete the movement of said member to its normal predetermined position, and operative connections between said member and said control means for actuating the latter during said movement of said member from its normally predetermined position to effect operation of said actuating means to release said work gripping means and during movement of said member toward its normal predetermined position to effect operation of said actuating means to cause said work gripping means to grip the work piece.

16. A machine tool as defined in claim 15 and wherein said work holder is rockable from its normal axially aligned position with respect to said tool holder to its misaligned position.

17. In a machine tool having a table supporting a work holder, a rotating tool holder relatively movable axially toward and away from said work holder; said work holder being normally axially aligned with said tool holder for machining operations on the work piece but movable to a misaligned position for loading and unloading purposes, work gripping means carried by said work holder to move relative thereto to grip and release a work piece and movable therewith when the work holder is moved to misaligned position to position the work gripping means entirely out of alignment with the tool holder to facilitate easy insertion and removal of a work piece and movable with the work holder when the latter is moved to aligned position to locate the work piece gripped by the work gripping means in alignment with said tool holder, and actuating means for said work gripping means; a manually operated member, operative connections between said member and said work holder for moving the latter from its normal tool holder aligned position to said misaligned position when said member is moved in one direction, spring means supported by said table and operatively associated with said work holder and said operative connections and energized when the work holder is moved to misaligned position and acting when said member is released by the operator to move said work holder to normal aligned position and to move said operative connection and said member in the opposite direction, and operative connections between said member and said actuating means controlling the latter during said movement of said member in one direction to effect release actuation of said work gripping means and during said movement of said member in the opposite direction to effect work gripping actuation of said work gripping means.

THOMAS J. HUDSON.

REFERENCES CITED

The following references are of record in the file of this patent:

UNITED STATES PATENTS

| Number | Name | Date |
|---|---|---|
| 454,684 | Parker | June 23, 1891 |
| 529,693 | Beckett | Nov. 27, 1894 |
| 757,561 | Moon | Apr. 19, 1904 |
| 957,194 | Doen | May 10, 1910 |
| 971,979 | Evans | Oct. 4, 1910 |
| 1,089,273 | Saylor | Mar. 3, 1914 |
| 1,261,432 | Parslow | Apr. 2, 1918 |
| 1,341,818 | Onsrud | June 1, 1920 |
| 1,701,863 | Reichel | Feb. 12, 1929 |
| 1,791,224 | Perkins | Feb. 3, 1931 |
| 1,843,365 | Jackson | Feb. 2, 1932 |
| 1,975,007 | Kingsbury | Sept. 25, 1934 |
| 2,045,550 | Havener | June 23, 1936 |
| 2,338,060 | Redmer | Dec. 28, 1943 |
| 2,356,438 | Wilson | Aug. 22, 1944 |

FOREIGN PATENTS

| Number | Country | Date |
|---|---|---|
| 559,230 | Germany | Sept. 17, 1932 |